April 23, 1957     F. V. KUZMITZ     2,789,417
TAILPIPE OR AFTERBURNING CONTROL FOR TURBOJET ENGINES
Filed March 22, 1949     2 Sheets-Sheet 2

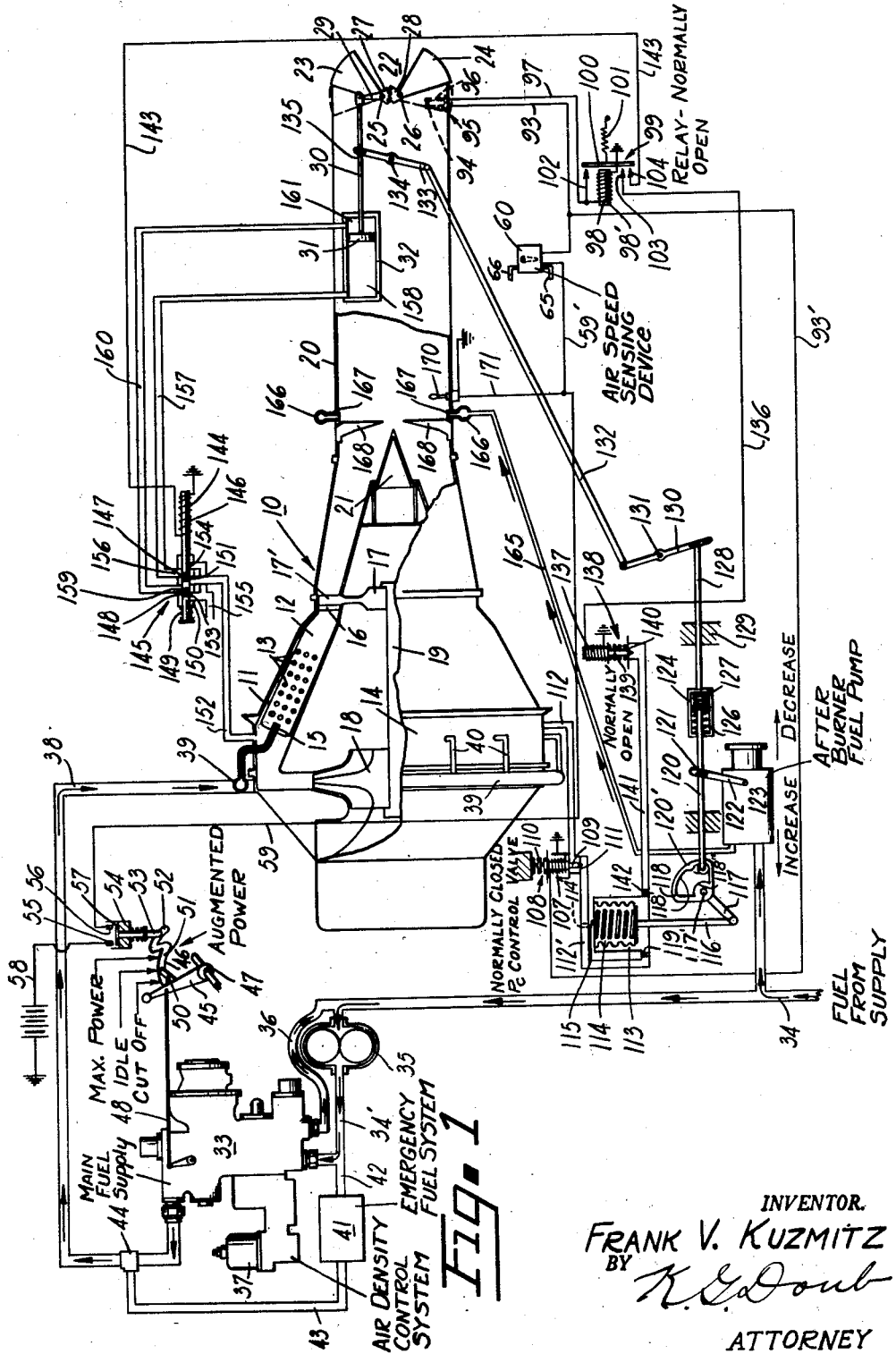

INVENTOR.
FRANK V. KUZMITZ
BY
ATTORNEY

United States Patent Office

2,789,417
Patented Apr. 23, 1957

2,789,417

TAILPIPE OR AFTERBURNING CONTROL FOR TURBOJET ENGINES

Frank V. Kuzmitz, South Bend, Ind., assignor to Bendix Aviation Corporation, South Bend, Ind., a corporation of Delaware Application March 22, 1949, Serial No. 82,792

14 Claims. (Cl. 60—35.6)

This invention relates to turbojet engines for aircraft, and is particularly concerned with means for obtaining thrust augmentation in such engines by burning fuel in the tailpipe or tailcone section of the engine. This method of obtaining thrust augmentation is commonly termed "tailpipe burning" or "afterburning"; in the following description and claims, the term "afterburning" will be more commonly used.

In such systems, a variable area reaction or nozzle jet is employed, and for maximum engine thrust efficiency, it is desirable to not only coordinate the rate of change of feed of the afterburning fuel with the rate of change of the jet nozzle area, but also to have a proper ratio of fuel-to-air for a given nozzle opening or area; and an object of the present invention is to provide improved means for accomplishing this result.

More specifically, the invention has for an object to provide an afterburning system for turbojet engines for aircraft incorporating control means which operates as a function of aircraft speed, compressor rise or discharge pressure and tailpipe temperature. The ultimate or net result is that the control will not operate unless the aircraft is traveling at a speed less than a predetermined or "red-line" value, the metering rate has as a modulus compressor discharge pressure or rise (herein abbreviated $P_c$ pressure or pressure rise), and is scheduled with jet nozzle area.

The invention further includes among its objects:

To provide an afterburning system for turbojet engines for aircraft incorporating means which will permit the pilot to set his control at a position calling for afterburning while at the same time the afterburning system will not operate in the event the aircraft is traveling at a rate of speed in excess of its so-called "red-line" value, viz. a speed beyond which the aircraft might be subjected to stresses greater than those for which it was designed and which would endanger the life of the pilot and the plane or aircraft.

To provide a system of the type specified having a safety control for the jet nozzle area which operates automatically as a function of tailpipe temperature and which also determines the time at which the normal afterburning supply of fuel is metered to the afterburning chamber;

To provide actuating means of the fluid servo type for the jet nozzle gate valves which will operate effectively at all temperature conditions and which at the same time is simple in construction and of minimum weight; and To generally improve and simplify afterburning systems for turbojet engines.

The foregoing and other objects and advantages will become apparent in view of the following description taken in conjunction with the drawings, wherein:

Figure 1 is a schematic view of a turbojet engine and coacting tailpipe or afterburning control mechanism in accordance with the invention;

Figure 3:
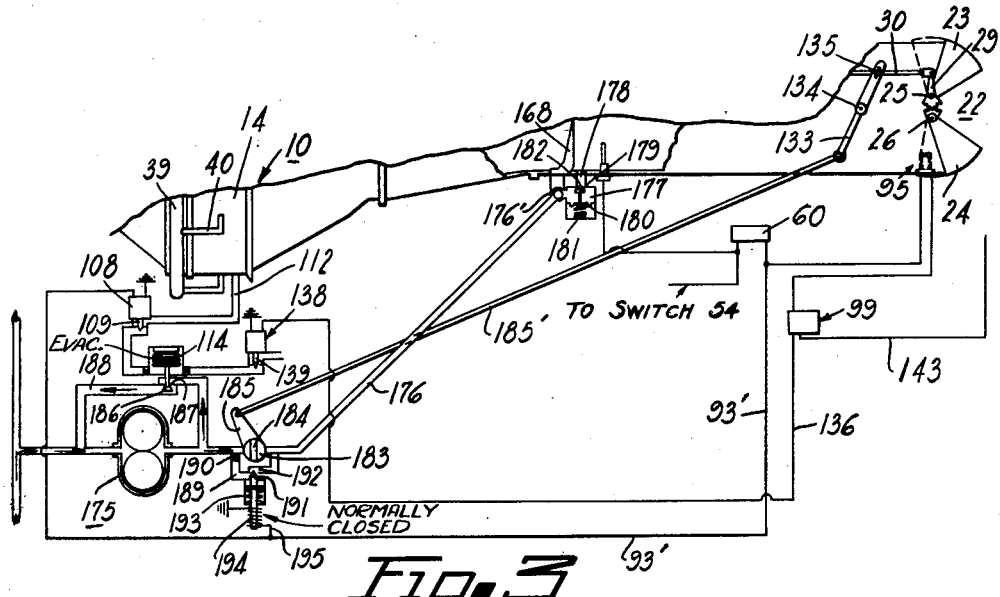
Figure 3 is a view similar to Figure 1 of a modification directed primarily to the fuel metering system.

The turbojet engine shown more or less diagrammatically in Figure 1 and generally indicated at 10 includes a burner system made up of a plurality of annularly arranged combustion chambers 11, each having therein a flame tube 12, the walls of which are formed with a series of openings 13 for admitting air thereinto from its surrounding chamber 11. An air adapter or header section 14 is detachably connected to the front end of the burner assembly and directs air under pressure to the chambers 11, where the major portion of the air enters the flame tubes 12 through the holes 13 and mixes with the fuel discharged from burner nozzles 15, there being one for each flame tube. The gases comprised of expanded air and products of combustion are discharged from the flame tubes through a nozzle diaphragm 16 and turbine blades 17', the latter forming part of a turbine rotor 17. A dynamic compressor is generally indicated at 18; it is shown as being of the centrifugal type, but may, of course, be of the axial flow type; it is driven from the turbine and is shown mounted on a shaft 19 common to the turbine rotor and compressor.

Beyond the turbines is the tailpipe 20; it carries a diffuser cone 21 at its entrance end and at its outlet terminates in a reaction jet or nozzle 22, the area of which is adjustable by means of a pair of gate valves 23 and 24 mounted on suitable bearings such as trunnions or short shafts 25 and 26. Also secured on said shafts are intermeshing segmental gears 27 and 28. An arm 29 is secured at one end on the shaft 25 and at its opposite end is connected through the medium of a link rod 30 with a servo piston 31 slidably mounted in a cylinder 32. The piston 31 is preferably operated by compressor discharge or $P_c$ pressure in a manner to be described.

Any suitable type of main fuel supply system may be adopted, that shown in the present instance and generally designated at 33 is of the type illustrated in a copending application of Frank C. Mock, Serial No. 716,154, filed December 13, 1946, now Patent No. 2,689,606, and assigned to the assignee of the present application. Fuel is supplied under pressure from a suitable source of supply such as a fuel tank, not shown, by way of conduits 34, 34' in which is mounted a fuel pump 35 of the positive displacement type having a by-pass 36 controlled by a suitable by-pass valve, not shown, but which is adapted to maintain the supply pressure at a predetermined value over and above metered fuel or discharge pressure. The device indicated at 37 is a bellows housing which forms part of a density control system for regulating the rate of fuel feed to the burners 12 as a function of changes in pressure and temperature of the air flowing to the engine. The metered fuel from the main fuel control 33 flows by way of a conduit 38 to a fuel manifold 39, from which it flows to the respective burner nozzles 15 through a series of branch nozzle pipes 40.

An emergency fuel metering system is usually provided. In the present instance it is shown in block diagram at 41 and may be in the form of an engine driven fuel pump located in an extension 42 of the conduit 34', the fuel being by-passed around the main fuel control 33 by way of a conduit 43 and thence through a double check valve 44 into the conduit 38. The emergency system is primarily for use in case the main fuel control or pump should fail or become ineffective and may be controlled by the pilot in any suitable manner, not shown.

The rate of fuel feed is under selective control from the pilot's compartment by means of a suitable power lever 45 adjustable along a quadrant 46, said lever being pivoted at 47 and connected by suitable linkage 48 to the governor or throttle valve of the main fuel control. Purely by way of example, the quadrant has indicated thereon four control positions, viz. fuel "cut-off," at which position all fuel flow to the burners is stopped and the engine is closed down; "idle," at which position the engine is operating at a suitable idling speed; "maximum power," at which setting the engine is delivering at some predetermined maximum output on the main fuel control; and "augmented power," at which position the afterburning system is placed in condition for operation automatically in a manner to be described.

The lever 45 is provided with a lateral projection 50 movable in a slot 51 formed in the quadrant 46; and when the said lever is set as "augmented power," the projection 50 moves into a communicating slot 52 and depresses a switch plunger 53, forming part of a main control switch, generally indicated at 54 and including a pair of contacts 55 and 56 adapted to be bridged by a conductor 57 when the plunger 53 is depressed. This energizes a circuit made up of wires 58, 59 and 59' leading from a battery or other suitable source of electrical energy to an air speed sensing device and coacting switch mechanism, generally indicated at 60 in Figure 1 and shown more or less in detail in Figure 2. This device may be of any suitable type, the form shown in Figure 2 simply being for the purpose of illustration. It comprises a pair of annular bellows 61 and 62 arranged in opposition and suitably anchored at 63 and 64, the bellows 61 communicating with the usual Pitot tube or $P_p$ pressure, not shown, by way of a conduit 65, and the bellows 62 communicating with a static pressure source, such as static pressure of the ambient atmosphere, by way of conduit 66. The bellows 61 has its movable end connected to a plate 67 carrying a contact member 68 and the bellows 62 has its movable end connected to a similar plate 69 carrying a contact member 70. To balance out the effect of changes in any air density or altitude, the bellows 61 and 62 are opposed by a pair of evacuated bellows 71 and 72 having their movable ends engaging the plates 67 and 69 and their opposite ends stationarily anchored at 73 and 74. The contact member 68 is adapted to actuate a lever 75 having its one end pivoted at 76 to a bracket 77 and its opposite end slotted and pivotally connected to a lever 78 by means of a pin 79. The lever 78 has a bell crank extension terminating in a switch arm or hand 78' and is pivoted or fulcrumed at 80 to a bracket 81. At its free end, the arm 78' is adapted to wipe a contact segment 82 having an insulated section 83 and a conductive or non-insulated section 84.

The static pressure contact member 70 is adapted to engage an arm 85 pivoted at 86 and having its free end engaging a roller 87, which is mounted in a yoke 88 formed on the one end of a slide rod 88', the latter being slidable in a guide 89 suitably supported at 90 and adjustable through the medium of a screw 91. Another roller 92 is mounted in the yoke 88 and is adapted to contact the lever 75.

As long as the aircraft on which the speed sensing device 60 may be mounted is traveling below a certain specified air speed, commonly termed the "red-line value," the hand or arm 78' contacts the conducting section 84 of the switch segment 82. If under these conditions the pilot should set the control lever 45 to "augmented power," an electric circuit will be closed to a normally closed $P_c$ bellows control valve 108 and also to the one element of a tailpipe temperature switch 95 in a manner and for reasons to be described. Should the aircraft exceed the red-line speed, the bellows 61 extends or expands and the arm 78' moves onto the insulated or nonconducting portion 83 of the switch segment. If, under the latter conditions the control lever 45 should be in "augmented power" position, the afterburning electric control circuit will remain de-energized.

The circuit wire 59' (Figure 1) is connected to the switch arm 78' of the speed sensing device 60, and the conducting section 84 of the switch segment 82 connects by means of wires 93 and 93' with the solenoid valve 108 above noted; and said wire 93 also connects with the one element 94 of thermostatic switch 95 located in the rear end portion of the tailpipe 20, the coacting element 96 of the said thermostatic switch having connected thereto a circuit wire 97 which leads to a switch terminal or contact 102, and said wire 97 also supplies current to the coil 98 of a relay generally indicated at 99 and having a pole piece 98' which when energized imparts closing movement to an armature or switch member 100. The relay 99 is of the normally open type, the switch member 100 being urged to open position by means of a spring 101. When the switch member 100 is closed, it engages contacts 102, 103 and 104. This results in (a) the closing of a normally open $P_c$ vent valve 138, and (b) resetting of the gate valves 23 and 24 to an open position in a manner to be described.

Reverting to the operation of the $P_c$ bellows control valve 108, which, as above noted, is of the normally closed type, when the circuit wires 93 and 93' are energized, the coil 107 of said valve is also energized, thereby opening needle 109. A spring 110 urges the needle 109 toward its normally closed position. The needle 109 controls a port or orifice 111 at the juncture of conduits 112 and 112', by means of which $P_c$ or compressor discharge pressure is conducted to a bellows chamber 113, having mounted therein a spring loaded bellows 114, suitable anchored at its upper end at 115 and having its movable end connected by means of a link rod 116 to the arm 117 of a contoured metering cam 118, rotatable on a fixed pin or bearing 117'. The bellows 114, in the form shown in Figure 1, is vented to the atmosphere at 114', so that the bellows will respond to changes in compressor discharge pressure minus ambient pressure, viz. compressor rise. A calibrated restriction 119 is located in conduit 112'. The cam 118 is operatively connected by means of cam follower or roller 120', link rod 120 and pin 121 to the control lever or arm 122 of a variable discharge pump, generally indicated at 123, and which may be of any suitable type whose output is variable in relation to the setting of a suitable control member such as the arm 122. The cam 118 is formed with an opening for receiving the roller 120', and has an outer contoured portion 118' and an inner contoured portion 118''. The roller 120' normally follows the outer contoured portion when the gate valves 23 and 24 are closed, and follows the inner contoured portion when the said valves are open. At its free end, the rod 120 extends into a spring housing 124 and is provided with a disc-shaped head having a pair of springs 126 and 127 disposed on opposite sides thereof. The spring support or housing 124 is secured to and moves with the adjacent end of a rod 128 and is mounted for relative sliding movement on the pump control rod 120, for a purpose to be described. Rod 128 is slidable in a suitable support or guide 129 and at its free or right-hand end is connected to the adjacent end of a lever 130 by means of a pin and slot connection, the said lever 130 being fulcrumed at 131 and at its opposite end being connected by means of a link rod 132 to a lever 133, fulcrumed at 134 and pivotally connected at 135 to the rod 30 of the gate valve servo piston 31.

When the $P_c$ bellows 114 is compressed by air under pressure admitted to chamber 113, it rotates the cam 118 clockwise, and since the gate valves 23 and 24 will at this time be in closed position, the initial movement of said cam moves the pump control lever 122 in a stroke-increasing direction. Since the pump control rod 120 is permitted a limited amount of travel independently of rod 128, the initial compression of the $P_c$ bellows may be used to meter starting fuel to the afterburning system at a predetermined rate before the gate valves 23 and 24 are opened for normal afterburning operation.

Reverting now to the relay 99, when the switch member 100 is closed, current is conducted by way of a circuit wire 136 to the coil 137 of the normally open solenoid Pc vent valve 138, the latter including a needle 139 which controls an orifice 140 in a conduit 141 communicating the bellows chamber 113 with the atmosphere. A restriction 142 is located in conduit 141 and coacts with the restriction 119 to determine the initial travel of the Pc bellows 114 and hence the amount of starting fuel that may be required for the afterburning system. Since the needle valve 139 is open up to the time the relay 99 receives a signal from the temperature switch 95, the bellows chamber 113 will have restricted communication with the atmosphere until the said needle closes, whereupon the said chamber will be subjected to full Pc or compressor discharge pressure and the travel of the bellows 114 will be proportionate to variations in such pressure.

Closing of the switch member 100 also energizes a circuit wire 143 and coil 144 of an electric servo valve 145 having a valve rod 146 provided with annular recesses 147 and 148, the said valve rod being normally urged toward gate valve closing position by means of a spring 149. A valve body 150 has an intake port 151 to which Pc or compressor discharge pressure is conducted by way of a conduit 152. The ports at 153 and 154 are drain or air release ports and have a common discharge conduit 155 connected thereto. In the position of the gate valves 23 and 24 as shown (closed position) air under Pc pressure is being communicated by way of port 156 and conduit 157 to the chamber 158 on the left-hand side of the servo piston 31. At this time the solenoid coil 144 is de-energized and the spring 149 is holding the valve rod 146 to the left. When the said coil becomes energized, valve rod 146 moves to the right and Pc pressure is communicated by way of port 159 and conduit 160 to chamber 161 on the right-hand side of said piston, whereupon the latter will move to the left and open or re-set the gate valves 23 and 24. By using compressor discharge pressure as the operating medium instead of oil or a like hydraulic fluid, the servo piston 31 will not tend to stick or lag due to coking and formation of carbon under high temperature conditions; also, since the motive pressure is utilized only when the compressor is delivering at or near its maximum and only for a relatively short time over the entire engine run or operating period, there is ample power available without necessitating the use of equipment that would increase the overall aircraft drag or weight and complexity of the afterburning system.

Afterburning fuel delivered by the pump 123 flows by way of a conduit 165 to a fuel manifold 166, shown located exteriorly of the tailpipe and provided with a plurality of fuel discharge nozzles 167. In the lee of these nozzles are a series of so-called jet bars or baffle members 168. The fuel discharged by the nozzles 167 is in part at least directed against the adjacent contoured surfaces of the baffles 168, which prevent the onrushing air from directly engaging the nozzle spray and serve to more uniformly distribute the latter in the tailpipe chamber.

An ignition circuit for the afterburning fuel is provided and may be of any suitable type. In the present instance it consists of a spark plug or its equivalent 170 having an ignition wire 171 which is connected to the wire 59, the said spark plug being rendered operative or energized when the switch member 54 is closed by the pilot.

*Operation*

Ordinarily, a thrust augmentation or afterburning system is not used until the rated maximum power available from the main burner system has been obtained by an advanced setting of the throttle or control lever 45. In the position of the control lever 45 as shown in Figure 1, the engine would be closed down and all flow of fuel to the burners would be cut off. Between cut-off position and up to and including the maximum power setting, the engine operates solely on the main burner system.

The various parts of the afterburning system are shown in nonoperating position, viz. the switch member 57 is open and all current to the spark plug or ignition circuit and the speed sensing circuit is cut off; temperature switch 95 is open and hence relay 99 is open; solenoid valve 108 is closed and hence the spring of the Pc bellows 114 is holding the latter extended and cam 118 has moved pump lever 122 back to no-delivery position; solenoid valve 138 is open; and finally, the coil 144 of the electric servo 145 is de-energized and valve rod 146 is held in its left-hand position by spring 149, at which time Pc pressure is being communicated to chamber 158 at the left-hand side of piston 31 and the tail gates are held in closed or in normal jet nozzle area position.

Assuming that the pilot is operating at a maximum power setting and decides to utilize the added thrust available by afterburning, he then moves the lever 45 to the augmented power position and simultaneously closes the switch member 57, whereupon current flows from the battery by way of wire 59 to the contact hand or wiper arm 78' of the air speed sensing device 60. Also, the ignition circuit is energized in preparation for igniting the initial discharge of fuel from the afterburning nozzles 167. If at this time the aircraft should be traveling at or beyond its red-line value (or at a speed at or in excess of that for which it was designed) the hand or indicator 78' would be in contact with the insulated portion 83 of the switch segment 82 and the afterburning system would remain idle. However, if the aircraft was traveling at a rate of speed below its red line value, the said hand or indicator 78' would be on the conducting portion 84 of the switch segment and current would flow by way of circuit wire 93 to the coil 107 of the normally closed solenoid valve 108 and open needle 109, whereupon compressor discharge pressure would be admitted to the chamber 113 of the Pc bellows 114 and cause the latter to partially collapse. This rotates cam 118 in a clockwise direction, which moves rod 120 to the left and sets the pump control lever at a position which will permit a predetermined amount of starting fuel to flow to the afterburning discharge nozzles 167. It should be noted that up to this time the needle 139 is open and hence the degree of collapse of the Pc bellows 114 will depend on the relative effective capacities of the calibrated restrictions 119 and 142, assuming a given or constant Pc pressure.

After ignition of this starting fuel, there will be an immediate rise in temperature in the tailpipe chamber, and the thermostatic switch 95 will close (switch element 94 will engage element 96), whereupon current will flow from wire 93 across said latter switch and energize the coil 98 of the relay 99. This will cause armature switch 100 to engage contacts 102, 103 and 104, resulting in two substantially simultaneous operations: (*a*) current flows by way of wire 136 to the coil 137 of solenoid valve 138, closing needle 139, whereupon full Pc or compressor discharge pressure is applied to bellows chamber 113, bellows 114 collapses further and rotates cam 118 to permit an increase in the setting of pump lever 122, and (*b*) current flows by way of wire 143 to the coil 144 of the electric servo 145, whereupon valve member 146 is moved to the right from the position shown, communicating port 151 with 159 and permitting Pc pressure to flow by way of conduits 151, 152 and 160 to the chamber 161 of the servo cylinder 32. This causes the piston 31 to move to the left and reset the tail gates 23 and 24 toward the open position shown in dotted lines. This opening action of the tail gates compresses spring 127 and the cam follower 120' is resiliently urged against the inner contoured surface or track of the cam 118. This cam determines the rate of fuel feed as a function of compressor pressure rise, while at the same time the interconnection between the cam, the pump control lever and the tailgate valves in the manner shown sets up a scheduling action of jet nozzle area and the rate of fuel feed.

When the pilot moves the lever 45 back to a normal power setting, the plunger 53 and switch member 57 move back to open position, whereupon the circuit to the ignition circuit and air-speed-sensing device is broken, solenoid valve 108 closes, and as tailpipe temperature drops, switch 95 opens and solenoid valve 138 also opens; spring 149 of the electric servo 145 moves valve rod 146 to the left, communicating Pc pressure to conduit 157. The spring of the Pc bellows 114 now extends the latter and cam 118 turns counterclockwise, while at the same time the pressure in chamber 158 on the left-hand side of servo piston 31 moves the latter to the right and closes the tail gates to normal jet nozzle area. This latter action acts through the linkage 133, 132, 130, 128 and 120 to reset the pump control element 122 to fuel cut-off position.

From the foregoing it will be observed that the afterburning system as disclosed herein uses compressor pressure rise as a metering modulus, the Pc bellows 114 acting through the cam 118 as the primary control of the pump output. Since compressor pressure rise, particularly in the higher speed ranges, is a substantially direct measure of air flow, this provides a substantially constant afterburning fuel-air ratio at all positions of the gate valves. Also, compressor pressure rise being a function of both entering air pressure and temperature and engine speed, it has a correlative action on the metering rate, since any increase in engine speed will produce an increase in compressor discharge pressure which in turn will result in an increase in the rate of afterburner fuel flow. Further, by having the control act through the air speed sensing device 60 and the tailpipe thermostatic switch 95, the afterburning system will not become operative until certain conditions are complied with even though the pilot shall have already set his lever to the afterburning position.

If desired, the bellows 114 of Figure 1 could be evacuated, in which event it would respond to compressor discharge pressure directly instead of compressor rise. However, in such case it would be desirable to provide suitable means for shutting off the flow of starting fuel when the afterburning system is idle.

*Figure 3*

Figure 2:
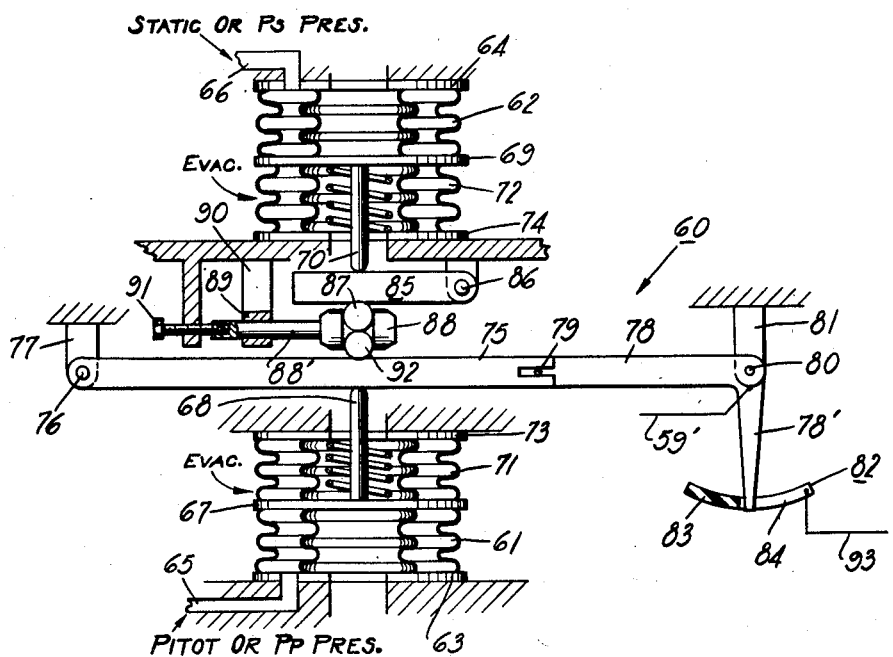
Figure 2 is a schematic view of a type of air speed sensing device which forms part of the control system.

In Figure 3, the system operates in substantially the same manner as that heretofore described and shown in Figures 1 and 2, except in this instance the bellows 114 is evacuated and hence the rate of afterburning fuel feed is proportional to compressor discharge (Pc) pressure instead of being proportional to compressor pressure rise as in Figure 1; also the variable displacement fuel pump 123 of Figure 1 is replaced by a by-pass type of positive displacement pump generally indicated at 175, the said pump taking fuel from the main supply line and delivering it by way of conduit 176 and fuel manifold 176' to the fuel chambers 177 of a series of constant pressure discharge nozzles 178, one only of which is shown in section, more to promote ease in reading the drawing than to illustrate any preference in nozzles. It has a nozzle valve 179 carried by a diaphragm 180 backed by a spring 181. The nozzle valve 179 controls a discharge orifice 182 which leads into the tailpipe chamber in lee of one of the baffle members 168. The nozzle valves may be set to open at any suitable pressure.

A valve 183 provided with a passage or port 184 is located in the line 176 and has an operating connection with the tail gate valves 23 and 24 by means of an arm 185, rod 185' and lever 133.

The Pc bellows 114 in this modified form of the invention is provided with a valve 186 controlling an orifice 187 in a by-pass conduit 188.

There is also a by-pass conduit 189 around the valve 183; it has a metering restriction 190 therein and is controlled by a normally closed solenoid valve 191 coacting with a port 192. A spring 193 urges the valve 191 to seated position; it is retracted through energization of a solenoid coil 194 electrically connected by wire 195 to the wire 93' from the speed indicator 60.

When the pilot sets his control lever to afterburning position, the ignition circuit is energized, and assuming the aircraft to be traveling at a speed below its red-line value, then current will flow by way of wire 93' to the normally closed solenoid valve 108 and open needle 109, whereupon the Pc bellows 114 will be collapsed a predetermined amount, depending upon the relative capacities of the restrictions 119 and 142, and by-pass valve 186 will move towards closed position. At the same time, coil 194 will be energized and by-pass valve 191 will be opened. A closing movement of valve 186 will increase the effective delivery pressure of fuel to the nozzles 178, and opening of valve 191 will permit starting fuel to be metered to the said nozzles by way of conduit 176 and manifold 176'. As this starting fuel is ignited and the temperature rises in the tailpipe, the temperature switch 95 closes, thereby closing the relay 99. This energizes the normally open solenoid valve 138, the needle 139 closes and bellows 114 is subjected to full Pc pressure, whereupon the by-pass valve 186 moves further towards closed position to increase the effective nozzle delivery pressure. Closing of the relay 99 also actuates the tail gate servo valve 145 of Figure 1 (not shown in Figure 3) and moves the tail gates to open position. This opens the valve 183 and brings port or passage 185 in registration with conduit 176, whereupon there is normal delivery of fuel to the afterburning nozzles 177.

Although only one complete embodiment of the invention and a modification of part thereof has been illustrated and described, various changes in form and arrangement of parts may be made to suit requirements.

I claim:

1. In a fuel supply system for a gas turbine engine having a main burner system before the turbine and a tailpipe section after the turbine provided with an exhaust jet, valve means for varying the effective area of the jet, a main fuel control device for regulating the supply of fuel to the main burner system, an afterburning fuel supply conduit for conducting fuel to the tailpipe section after the turbine, means for varying the rate of flow of afterburning fuel through said conduit, means responsive to an engine operating condition connected to said rate-varying means for metering afterburning fuel at a predetermined rate, means for igniting the afterburning fuel, means for operating said jet area valve, means responsive to tailpipe temperature connected to said valve-operating means for automatically effecting operation of the latter as a function of tailpipe temperature, and means responsive to operation of said valve means also connected to said rate-varying means permitting an increase in the metering rate only upon an increase in the area of the jet.

2. A system as claimed in claim 1 wherein the means for metering afterburning fuel is responsive to compressor discharge pressure.

3. A system as claimed in claim 1 wherein the means for metering afterburning fuel is responsive to a pressure varying with variations in compressor rise.

4. A system as claimed in claim 1 wherein the means for controlling the rate of supply of afterburning fuel comprises a pressure responsive device which is subjected to a pressure varying with variations in compressor discharge pressure and the means responsive to tailpipe temperature is operative to vary the effective pressure to which said device is subjected.

5. In a fuel supply system for a gas turbine engine having a main burner system before the turbine and a tailpipe section after the turbine provided with an exhaust jet, valve means for varying the effective area of the jet, a main fuel control device for regulating the supply of fuel to the main burner system, and an afterburning fuel control comprising: a fuel supply conduit for conducting fuel to the tailpipe section after the turbine, a fuel pressurizing means for establishing a flow of fuel under pressure through said conduit, a control element movable to vary the rate of fuel flow, a pressure responsive device operatively connected to said element, means for subjecting said device to a pressure varying with variations in compressor delivery pressure, means for adjusting the effective pressure to which said device is subjected to initiate a flow of starting fuel to said tailpipe section when the afterburning fuel control is placed in operation, means for igniting the starting fuel, means responsive to tailpipe temperature operatively connected to said adjusting means for automatically increasing the effective pressure on said device following ignition and burning of the starting fuel, power means for actuating said valve means, and means also responsive to tailpipe temperature for controlling the operation of said power means.

6. A fuel supply system as claimed in claim 5 plus means interconnecting said control element and valve means for coordinating the rate of afterburning fuel feed and jet nozzle area.

7. A fuel supply system as claimed in claim 5 wherein said pressure responsive device consists of a spring-loaded capsule mounted in a chamber provided with an intake passageway in communication with a source of compressor delivery pressure and an outlet passageway venting the chamber to a low pressure area, calibrated restrictions in said passageways, a normally closed valve controlling said intake passageway and a normally open valve controlling said outlet vent passageway, means for opening the inlet valve when the afterburning system is to be put in operation, and means responsive to tailpipe temperature connected to said outlet vent valve for closing the latter automatically to increase the effective pressure to which said capsule is subjected following ignition and burning of the afterburning starting fuel.

8. In a fuel supply system for a gas turbine engine for aircraft having a main burner system before the turbine and a chamber for the combustion of fuel after the turbine to obtain thrust augmentation, a main fuel control device for regulating the supply of fuel to the main burner system having a movable power control member, an afterburning fuel system including a conduit for conducting fuel to said chamber, means for establishing a flow of fuel under pressure through said conduit, means interconnecting said power control member and flow-establishing means rendering said latter means operative upon adjustment of said member to a predetermined position, and means responsive to the speed of travel of the aircraft interposed in said interconnecting means effective to set said flow establishing means in operation only at aircraft speeds below a predetermined value.

9. In a fuel supply system as claimed in claim 8 wherein said means interconnecting said power control member and flow-establishing means comprises an electrical circuit which is energized when said member is moved to a predetermined position and said speed responsive means consists of an air speed indicator having a movable circuit make and break device interposed in said circuit and preventing completion of the circuit to said flow-establishing means when the aircraft is traveling at a speed in excess of a predetermined value.

10. In a system for obtaining thrust augmentation in a turbojet engine for aircraft by burning fuel in a chambered area after the turbine, means for varying the area of the jet, an afterburning fuel control including a conduit for supplying fuel to said chambered area, means for establishing a flow of fuel under pressure through said conduit, a pilot's control member operatively connected to said flow-establishing means for placing the latter in operation when afterburning is desired, an air speed responsive device having an element movable to a position preventing operation of said flow-establishing means at air speeds above a predetermined value, said flow-establishing means including means rendered operative by said movable element at air speeds below a predetermined value to initiate a flow of starting fuel to said chambered area, means for igniting the starting fuel, means responsive to a rise in tailpipe temperature for actuating said jet-varying means in a direction to increase the area of the jet following ignition and burning of the starting fuel, and means responsive to an increase in the area of the jet for increasing the rate of fuel feed.

11. A system as claimed in claim 10 wherein the means rendered operative to initiate a flow of starting fuel at air speeds below a predetermined value comprises a device responsive to a pressure varying with variations in compressor discharge pressure and a fuel delivery control element operatively connected to said device.

12. In a system for obtaining thrust augmentation in a turbojet engine for aircraft by burning fuel in a chambered area of the tailpipe after the turbine in addition to that normally supplied to the burners before the turbine and said tailpipe having a discharge jet, valve means for varying the area of the jet, a main fuel control for the normal fuel supply and an afterburning fuel control arranged to coact therewith; said afterburning control comprising: one or more afterburning fuel nozzles arranged to spray fuel into said chambered area, means for delivering fuel under pressure to said nozzles, a fuel control element actuatable to vary the rate of fuel supply, means for actuating said element automatically in response to variation in an engine operating condition, an air speed indicator having an element operatively connected to said actuating means and movable to automatically render the latter operative only at aircraft speeds below a predetermined value, means for operating said jet nozzle valve means, and means for coordinating the rate of afterburning fuel supply with change in jet nozzle area.

13. A system as claimed in claim 12 wherein there is arranged in series with said speed indicator an electric switch which is responsive to tailpipe temperature and said switch is operatively connected through a relay with the fuel control element actuating means and also with power means for operating said valve means and when the tailpipe temperature rises to some predetermined value said switch closes and acts through said relay to (a) increase the rate of fuel supply and (b) increase jet nozzle area.

14. In a system for obtaining thrust augmentation in a turbojet engine for aircraft by burning fuel in a chambered area of the tailpipe after the turbine in addition to that normally supplied to the burners before the turbine and said tailpipe having a discharge jet, means for varying the area of the jet, a main fuel control for the normal fuel supply and an afterburning fuel control arranged to coact therewith; said afterburning control comprising: one or more afterburning fuel nozzles arranged to spray fuel into said chambered area, means for delivering fuel under pressure to said nozzles, a fuel control element actuatable to vary the rate of fuel supply, a pressure responsive device operatively connected to said control element, a passageway for communicating compressor discharge pressure to said device, a restriction in said passageway, a normally closed electric solenoid valve controlling said passageway, a vent passageway for varying the effective pressure on said device, a second restriction in said latter passageway calibrated in relation to said first-named restriction, a normally open electric solenoid valve controlling said vent passageway, an aircraft speed indicator and an electric switch controlled thereby and electrically connected to said normally open solenoid valve, an electric thermostatic switch responsive to changes in tailpipe temperature in series with said speed indicator switch and a relay in series with said thermostatic switch, a servo motor for operating said area varying means and an electrically operated servo valve for said motor, said relay including an electric switch which is electrically connected to said normally open solenoid valve and said servo valve, said speed indicator when the aircraft is traveling at a speed below a predetermined value functioning to open said first-named passageway and admit compressor discharge pressure to said pressure responsive device and said temperature switch being adapted to close when the tailpipe temperature rises to some predetermined value and act through said relay to close said vent passage and also operate said servo valve.

References Cited in the file of this patent

UNITED STATES PATENTS

| | | |
|---|---|---|
| 2,379,455 | Prince | July 3, 1945 |
| 2,402,363 | Bradbury | June 18, 1946 |
| 2,409,176 | Allen | Oct. 15, 1946 |
| 2,411,895 | Poole | Dec. 3, 1946 |
| 2,450,535 | Watson et al. | Oct. 5, 1948 |
| 2,457,595 | Orr | Dec. 28, 1948 |
| 2,464,724 | Sédille | Mar. 15, 1949 |
| 2,487,588 | Price | Nov. 8, 1949 |
| 2,503,048 | Ifield | Apr. 4, 1950 |
| 2,520,967 | Schmitt | Sept. 5, 1950 |
| 2,563,270 | Price | Aug. 7, 1951 |
| 2,569,497 | Schiesel | Oct. 2, 1951 |
| 2,570,591 | Price | Oct. 9, 1951 |
| 2,575,879 | Lombard | Nov. 20, 1951 |
| 2,580,962 | Sedille | Jan. 1, 1952 |
| 2,593,536 | Chamberlin et al. | Apr. 22, 1952 |

FOREIGN PATENTS

| | | |
|---|---|---|
| 587,558 | Great Britain | May 7, 1947 |
| 588,502 | Great Britain | May 27, 1947 |
| 919,004 | France | Nov. 18, 1946 |
| 941,556 | France | July 19, 1948 |
| 250,563 | Switzerland | June 16, 1948 |

OTHER REFERENCES

"Patent Office Practice," third edition, by Archie R. McCrady, published by Pacot Publications, pages 205–206, and pages 190–191.